United States Patent Office 3,448,165
Patented June 3, 1969

3,448,165
CATALYTIC DEHYDROGENATION OF PARAFFINIC HYDROCARBONS AT HIGH SPACE VELOCITY
Herman S. Bloch, Skokie, Ill., assignor to Universal Oil Products Company, Des Plaines, Ill., a corporation of Delaware
No Drawing. Filed July 26, 1966, Ser. No. 567,822
Int. Cl. C07c *3/34;* B01j *11/40*
U.S. Cl. 260—683.3      5 Claims

ABSTRACT OF THE DISCLOSURE

Production of the mono-olefin from $C_{10}$–$C_{18}$ n-paraffin without skeletal rearrangement is accomplished at LHSV of at least 12.0 thru fixed bed of arsenic-attenuated platinum on lithiated alumina at 15–20% once-thru conversion levels in temperature range 400–600° C., pressures of 10 p.s.i.g. or higher, and 8:1 $H_2$/hydrocarbon mole ratio. Catalyst stability is silghtly better when processing the lower homologs but they require slightly more intense treatment for same conversion level.

---

This application encompasses a process for the catalytic dehydrogenation of paraffinic hydrocarbons to produce olefinic hydrocarbons. More specifically, the invention described herein is directed toward a process for the catalytic dehydrogenation of long chain paraffinic hydrocarbons to produce long chain mono-olefinic hydrocarbons of the same carbon number, which process increases the degree to which conversion equilibrium may be approached without incurring detrimental side reactions which adversely affect the efficiency of conversion to the desired mono-olefin. More particularly, through the practice of the present invention, and the use therein of a particular catalytic composite, normally liquid paraffinic hydrocarbons containing from about five to about twenty carbon atoms per molecule are dehydrogenated to mono-olefinic hydrocarbons, and an extended period of operation is afforded during which the catalyst exhibits acceptable stability. The present invention is particularly advantageous for the dehydrogenation of long chain normal paraffins containing from about ten to about eighteen carbon atoms per molecule, including decane, undecane, dodecane, tridecane, pentadecane, hexadecane, heptadecane, mixtures thereof, etc., in order to produce normal mono-olefins.

The uses of olefinic hydrocarbons are numerous, and are applied with success in a multiple of industries including the petroleum, petrochemical, pharmaceutical, plastics industry, heavy chemical, etc. Pentenes are primarily employed in organic synthesis, and alpha-n-amylene (1-pentene), in addition to its value as a monomer in polymerizations of the Zeigler-Natta type, is often used as a component blending agent for high octane motor fuel. Longer chain paraffins, having from 7 to 20 carbon atoms per molecule, and especially those having from 10 to 18 carbon atoms, can be dehydrogenated to form intermediate olefins for use in the alkylation of benzene to make sulfonated detergents, or of phenol to make oxyethylated nonionic detergents. Other uses of the long-chain mono-olefins include direct sulfation to form biodegradable alkylsulfates of the type R—$OSO_3Na$; direct sulfonation with sodium bisulfite to make biodegradable sulfonates of the type $RSO_3Na$; hydration to alcohols which are used to produce plasticizers or synthetic lube oils of the general type A—$(COOR)_2$, where $$A—(COOH)_2$$

is a dibasic acid such as phthalic or sebacic; hydration to alcohols followed by dehydrogenation to form ketones which can be used in the manufacture of secondary amines by reductive alkylation; ester formation by direct reaction with acids in the presence of a catalyst such as $BF_3$-etherate; and, in the preparation of di-long chain alkylbenzenes, of which the heavy metal sulfonate salts are prime lube oil detergents.

In order that a dehydrogenation process might achieve commercial success, the use of a suitable dehydrogenation catalyst is required. Thermal conversion of paraffins to the corresponding olefins can be carried out provided a sufficiently high temperature is utilized. However, as a result of high temperature pyrolysis, the main reaction becomes cracking which is undesirable from the standpoint of product quality and yield. At temperatures sufficiently low to avoid deleterious cracking reactions, little or no dehydrogenation of the praffin takes place. The use of dehydrogenation catalysts partially avoids this difficulty by permitting a relatively low temperature operation for dehydrogenation, thus eliminating excessive cracking. It is recognized that prior art processes for dehydrogenation are replete with suggestions of numerous catalysts which can be used in promoting the low temperature conversion of paraffins to olefins. Such catalysts generally consist of one or more metallic components from the metals of Groups VI and VIII of the Periodic Table, and/or compounds thereof. These catalysts are employed either unsupported, generally in powder or small particle form, or supported, or carried by a suitable refractory inorganic oxide material. Thus, suitable prior art catalytic composites have been found to comprise one or more components selected from chromium, tungsten, molybdenum, iron, cobalt, nickel, platinum, palladium, iridium, ruthenium, rhodium, osmium, and various compounds thereof. These are generally composited with a carrier material comprising one or more refractory inoganic oxides from the group of alumina, silica, zirconia, magnesia, thoria, hafnia, titania, boria, etc. Notwithstanding the wide variety of dehydrogenation catalysts, it becomes evident, from a perusal of the prior art, that any proposed catalyst appears to possess inherently one or more drawbacks which detract from the suitability and acceptability thereof. Some catalysts are too active, to the extent that undesirable side reactions are promoted even at low temperatures. Others are too inactive at low temperatures to promote an acceptable degree of dehydrogenation. Still others are insufficiently stable to be effective for an extended period of time, and do not foster a commercially attractive process.

In conjunction with the various difficulties involved in selecting a suitable catalyst, there is the aspect of reaction equilibrium to consider. Prior art dehydrogenation has generally been effected at conditions including a temperature in the range of from 400° C. to about 700° C. (about 750° F. to 1300° F.), a pressure from 0 to 100 pounds per square inch gauge, a liquid hourly space velocity within the range of from about 1.0 to about 8.0, and in the presence of hydrogen in an amount to result in a mol ratio of from 1:1 to about 20:1, based upon the paraffin charge. When operating at, or extremely close to equilibrium conversion, regardless of the character of the catalyst being used, or the degree to which it successfully promotes dehydration, various side reactions, including at least some cracking and skeletal isomerization, are also effected. For instance, in a process for the dehydrogenation of n-dodecane, at close to equilibrium conditions, a significant degree of conversion to diolefins and aromatic hydrocarbons results. These, as well as other side reactions obviously detrimentally affect the efficiencey of conversion to the desired n-dodecene, and tend to adversely affect the economic considerations of the process.

An object of the present invention is to provide a controlled paraffin dehydrogenation process which can function at close to equilibrium without suffering from an excessive degree of side reactions leading to decreased efficiency, excessive cracking which results in the overproduction of low molecular weight waste gases, or the deposition of carbon onto and within the catalyst, thereby effectively shielding the active surfaces and centers thereof from the material being processed.

When the dehydrogenation process of the present invention is conducted as hereinafter described in greater detail, I have observed that the small amount of side reactions which do occur, take place in a manner such that dienes are formed to a greater degree than aromatic hydrocarbons which, in turn, are produced in greater quantities than are cracked products. There is essentially no skeletal isomerization of n-olefins to branched-chain olefins. Generally, the cracked products, as well as trienes, are produced only in trace quantities and, if the charge stock is free from naphthenes, the amount of aromatic formation is very small. Diene formation is more prevalent at the start of an operation when the catalytic composite is fresh, but declines to about 2.0% of the mono-olefin formation when the catalyst has become aged. The presence of these minor quantities of dienes in the olefinic product is not particularly troublesome with respect to the ultimate use of the olefins. For example, when the olefin product is alkylated with benzene, the diene tends either to undergo cyclization to alkylindans or alkyltetralins, or to form diphenyl alkanes, of which the first two may be utilized as part of the alkylate and the latter easily separated from the desired alkylate. Where the olefin is intended for direct sulfation to form biodegradable alkylsulfates, the product of any dienes drops into the acid phase and again is easily separable from the desired product.

Another object of the present invention is to provide a dehydrogenation process to produce long chain mono-olefins without incurring the simultaneous production of branched-chain olefins. Although spectroscopic methods of analysis have not detected any branched olefins in the product, up to about 5.0% or even 10.0% of monobranching (based upon the mono-olefins) would not be objectionable for ultimate use in preparing biodegradable alkylbenzene sulfonate detergents. In the case of alkylsulfate detergents, however, branching in even such small amounts leads to unstable tertiary sulfates. Based upon the high degree of stability of some of the sulfates I have prepared from the mono-olefin product of the present invention, the degree of branching must necessarily be exceedingly small.

Therefore, in a broad embodiment, the present invention relates to a process for the dehydrogenation of a paraffinic hydrocarbon, which process comprises contacting said hydrocarbon with a catalytic composite of alkalized alumina, a Group VIII metallic component and a metallic component selected from the group consisting of arsenic, antimony, bismuth and compounds thereof, at dehydrogenating conditions including a temperature within the range of from about 400° C. to about 600° C. and a liquid hourly space velocity above about 10.0.

This process is further characterized in that a particularly preferred catalyst comprises lithiated alumina containing from about 0.05% to about 5.0% by weight of a Group VIII noble metal, and especially platinum. Although advantageous results are obtained at temperatures from about 400° C. to about 600° C., it is preferable to operate within an intermediate temperature range of from about 430° C. to about 530° C. As hereinafter indicated in a specific example, the operating pressure is above about 10.0 p.s.i.g., with an upper limit of about 100.0 p.s.i.g. Particularly preferred pressures are in the range of from 15.0 to about 40.0 p.s.i.g. Pressure is maintained within the reaction zone through the use of compressive hydrogen recycle in an amount such that the mol ratio of hydrogen to liquid hydrocarbon charge is less than 15:1 and preferably less than about 10:1, the hydrocarbon charge rate being sufficient to result in a liquid hourly space velocity (defined as volumes of hydrocarbon charge per volume of catalyst disposed in the reaction zone) of from 12.0 to about 40.0. The dehydrogenation of the long chain paraffinic hydrocarbon is somewhat further facilitated through the use of an inert diluent admixed with the charge stock. Suitable diluents include water, methane, argon and nitrogen which are used in amounts within the range of about 100 p.p.m. to 100,000 p.p.m., based upon the quantity of liquid hydrocarbon feed. Dilution of the charge stock in this manner improves the degree to which equilibrium conversion can be approached without substantial loss in conversion activity.

The fourth component of the catalytic composite, in addition to the lithiated alumina and platinum, is selected from the metals of Group V-A of the Periodic Table, and compounds thereof. By way of explanation, the term "Group V-A," in the present specification and in the appended claims, alludes to the Periodic Chart of the Elements, Fisher Scientific Company, 1953. Also, it is recognized that the elements of this group are often referred to as "non-metallic" due to their peculiar characteristics. However, for the sake of convenience and consistency, these elements are herein referred to as "metals." Thus, the catalytic composite for use in the dehydrogenation process herein described, comprises a metallic component from the group of arsensic, antimony, bismuth and compounds thereof. Of these, arsenic and antimony are preferred, with arsenic being particularly preferred. These catalytic attenuators are employed in amounts based upon the concentration of the Group VIII metallic component, and will be present in an atomic ratio (to the Group VIII metal) within the range of from 0.1 to about 0.8. Intermediate concentrations are suitably employed, such that the atomic ratio in the final catalytic composite is about 0.2 to about 0.5. It is understood that regardless of the precise form in which the various catalytic components exist, the concentrations are calculated on the basis of the elemental metals.

A specific embodiment of the present invention is directed toward a process for dehydrogenating a normal paraffinic hydrocarbon containing from about ten to about eighteen carbon atoms per molecule, which process comprises contacting said paraffinic hydrocarbon with a catalytic composite of alumina, 0.01% to about 1.5% by weight of lithium, 0.05% to about 5.0% by weight of platinum and arsenic in an atomic ratio to platinum from about 0.2 to about 0.5 and at dehydrogenating conditions including a temperature within the range of from about 400° C. to about 600° C., a liquid hourly space velocity of from about 12.0 to about 40.0, and a pressure above about 10.0 p.s.i.g.

The particularly preferred dehydrogenation catalyst, employed in the process of the present invention, makes use of a non-acidic, and especially halogen-free, refractory inorganic oxide carrier material. The term "non-acidic" is intended to preclude the use of halogen components and those inorganic oxides which possess the acidic function characteristic of material which fosters cracking reactions. The non-acidic carrier is combined with a Group VIII noble metal component, an alkali metal component and a catalytic attenuator as above described. In some instances, the catalyst will comprise an alkaline-earth metal component, including calcium, magnesium and/or strontium, although the alkali metals, cesium, rubidium, potassium, sodium and especially lithium are preferred. The Group VIII noble metal, palladium, iridium, ruthenium, rhodium, osmium, and especially platinum, may exist within the composite as the element, as a chemical compound, or in physical association with the other catalyst components. In any event, the Group VIII metal is used in an amount of from about 0.05% to about 5.0%, calculated as if existing as the elemental metal. The alkali metals will be utilized in an amount generally not exceeding 5.0% by weight; in order to achieve a proper balance between inhibiting the occurrence of side reactions, and imparting the desired degree of stability, the alkali metals will usually be used in significantly lower concentrations. Therefore, they will generally be present in a concentration within the range of from about 0.01% to about 1.5% by weight, calculated as the element.

The catalyst for use in the present process may be prepared in any suitable manner, and it is understood that the particular method chosen is neither essential to, nor limiting upon the present invention. In general, the initial step involves the preparation of the inorganic oxide carrier material and the forming thereof into the desired size and/or shape. A suitable carrier material, for example, is an alumina having an apparent bulk density less than about 0.50 gram/cc., with a lower limit of about 0.15 gram/cc. The surface area characteristics are such that the average pore diameter is about 20 to about 300 Angstroms, the pore volume is about 0.10 to about 0.80 milliliters/gram and the surface area about 100 to about 700 square meters per gram. The alkali metal, or alkaline-earth metal, may be added as an aqueous solution thereof, and thus may comprise a chloride, sulfate, nitrate, acetate, carbonate, such as lithium nitrate, hydroxide, etc. Similarly, the platinum component or other Group VIII noble metal, may be composited in any suitable manner, one particularly convenient method involving the use of an impregnating solution of a water-soluble platinum compound such as chloroplatinic acid. The impregnated carrier is then dried at a temperature of from 100° F. to 300° F., and thereafter subjected to a calcination treatment at an elevated temperature of from 800° F. to about 1100° F.

A feature of the present invention involves the simultaneous use of a fourth catalytic component with the platinum and lithiated alumina. As hereinbefore set forth, this fourth component is selected from the group consisting of arsenic, antimony, bismuth and compounds thereof. Of these, arsenic appears to yield the better results with most normal paraffins, and possesses an unusual affinity for the platinum, such that it remains within the catalytic composite for an extended period of time. On the other hand, bismuth is probably least preferred since it appears to be most susceptible to variation in its effectiveness during processing.

Although it can be shown that supported platinum-containing catalysts are very active in promoting the dehydrogenation of hydrocarbons, they inherently possess additional, objectionable properties which stem from the overall activity and ability which platinum has for promoting other types of reactions. The alkali metal component effectively inhibits a substantial amount of the cracking and skeletal isomerization reactions, by neutralizing at least a portion of the inherent acid function possessed by platinum as well as that of the carrier material; however, sufficient cracking activity remains such that higher temperature operation to increase conversion is precluded. Furthermore, there still is present the inherent capability of the platinum to promote isomerization and cyclization reactions. This is further compounded by the fact that where higher temperature operation can be afforded to increase conversion without a substantial increase in cracking, there exists an accompanying increase in the tendency to promote these other side reactions. Thus, at a given temperature and conversion level, the addition of lithium for the purpose of decreasing cracking activity to permit increasing temperature to increase dehydrogenation, falls short of economic acceptability due to the increased tendency toward aromatization, whereby the efficiency of conversion suffers.

The primary function of the catalytic attenuator, arsenic, antimony and/or bismuth is actually two-fold, although the intended effect is the same. That is, the catalyst attenuator is specifically intended to poison the platinum to the extent that its residual cracking activity is virtually completely curtailed, and the tendency to promote other side reactions, particularly cyclization, is substantially eliminated. The uniqueness of these attenuators resides in the fact that the dehydrogenation activity of the platinum component is hardly affected. The doping, or poisoning action of the attenuator is highly selective in this regard. There is actually no dehydrogenation activity supplied by the attenuator, but rather a doping or poisoning effect directed toward the specific side reactions which the platinum component is otherwise capable of promoting. To illustrate, in a situation where two catalysts were prepared, one with an arsenic attenuator, the other with one-half the quantity of platinum and no attenuator, the overall conversion in the case of the second catalyst decreased more than the cracking, whereas the attenuated catalyst inhibited cracking without decreasing conversion.

Another advantage of the attenuated catalyst resides in the suppression of the tendency for the desired constituents of the product stream to undergo further dehydrogenation to dienes and trienes. Through the increased efficiency of conversion to the mono-olefin, and the increased stability of the catalytic composite, the overall beneficial effect resides in the resulting economic considerations involved in the effective catalyst life and the total quantity and quality of desired product.

The attenuator, as with the lithium and platinum components, may be incorporated into the catalytic composite in any suitable manner, an especially convenient method utilizing an impregnating technique followed by drying and calcination. When the attenuator is arsenic and/or antimony, the impregnating solution may be an ammoniacal solution of the oxides thereof, such as $As_2O_5$.

The following examples are presented for the purpose of illustrating the dehydrogenation process hereinbefore described and to indicate the benefits derived through the utilization thereof. It is not intended to limit the scope of the invention, as defined by the appended claims, to the catalyst, operating conditions, concentrations, charge stock, etc., used in these examples. Modification of these variables, within the aforesaid limits, may be made by those skilled in the art of petroleum refining operations, in order to achieve optimum economic advantage in a given situation.

In the examples which follow, the catalytic composite was disposed in a stainless-steel tube of ⅞-inch nominal inside diameter. Unless otherwise indicated, the quantity of catalyst disposed therein ranged from about 25 cc. to 30 cc., above which was placed approximately about 30 cc. of alpha-alumina particles. The heat of reaction was supplied by a spiral inner preheater located above the alpha-alumina ceramic particles. The operating conditions include temperatures of from about 425° C. to about 600° C. and imposed hydrogen pressures from about 10.0 to about 50.0 p.s.i.g. Since the liquid hourly space velocity is a most important variable with respect to the present invention, its value, defined as volumes of paraffin charge per hour per volume of catalyst disposed within the reaction zone, was varied considerably. Hydrogen was introduced to the reaction zone in admixture with the hydrocarbon charge in a mol ratio of from about 2:1 to about 8:1, with respect to the paraffin charge. The non-attenuated catalytic composite was a commercially available alumina carrier which had been impregnated with chloroplatinic acid and lithium nitrate to yield a finished catalyst containing usually 0.75% by weight of platinum and 0.5% by weight of lithium. When this catalyst was "doped" with an attenuator, for example arsenic, an ammoniacal solution of an oxide, $As_2O_5$, was utilized in the quantity required to give the desired atomic ratio of arsenic to platinum. The incorporation of the arsenic component was made by impregnating the lithiated alumina-platinum composite, followed by drying at a temperature of about 210° F. and calcination in a muffle furnace for approximately 2 hours at a temperature of 932° F.

Example I

Dehydrogenation of n-dodecane was accomplished utilizing an alumina catalyst containing 0.75% by weight of platinum, 0.5% by weight of lithium and arsenic in an atomic ratio to platinum of 0.47, the composite being in a finely divided form of 20 to 40 mesh. The operating pressure was 10.0 p.s.i.g., the hydrogen to hydrocarbon mol ratio was 2.0, the liquid hourly space velocity was 4.0 and the temperature at the inlet to the reaction zone was 550° C. The dehydrogenated product effluent was collected for a period of two hours, and analysis indicated 47.8% conversion of the n-dodecane. Of this amount, 10.8% were mono-olefinic, 1.9% di-olefinic and 26.2% had been converted to aromatic hydrocarbons; the selectivity of conversion to the desired mono-olefin was, therefore, 22.6%. This portion of Example I illustrates the relatively poor results obtained at liquid hourly space velocities below 10.0. It is seen that at longer residence time, with respect to the long chain paraffins, the opportunity for side reactions is greatly enhanced with the result that not only di-olefins are produced, but a considerable quantity of aromatic hydrocarbons.

In another two-hour test period, in which the space velocity was increased to 8.0, and the temperature to 575° C., the conversion was 34.9%, with 9.7% mono-olefin production, indicating a conversion selectivity of 27.8%. The di-olefins were produced in an amount of 2.3% and the aromatic hydrocarbon production decreased to 13.8%.

A third two-hour test period was performed with the liquid hourly space velocity at 16.0, the temperature at 500° C. and the hydrogen to hydrocarbon mol ratio at 4.0. The percent conversion was 18.9, with a selectivity of 84.2%; 1.2% di-olefins and 1.9% aromatic hydrocarbons were produced. The result of increasing the liquid hourly space velocity to a level greater than 10.0 is readily noted to be a remarkable increase in the selectivity of conversion with a corresponding decrease in the quantity of di-olefins and aromatic hydrocarbons produced.

Example II

For this example, 5.0 cc. of catalyst was employed, with 11.0 cc. of alpha-alumina particles. The catalyst bed inlet temperature was maintained at 475° C., the pressure was 10.0 p.s.i.g., the liquid hourly space velocity was 16.0 and the hydrogen to hydrocarbon mol ratio was 8.0. Two different catalytic composites were employed, the composition thereof being varied in order to determine the effect of the lithium compound with respect to the long-chain paraffinic hydrocarbons. Each test period was of two-hour duration, the results of which are presented in the following Table I:

TABLE I.—EFFECT OF LITHIUM

| Catalyst designation | A | B |
| --- | --- | --- |
| Catalyst composition, wt. percent: | | |
| Platinum | 0.75 | 0.75 |
| Lithium | 0 | 0.50 |
| Arsenic/platinum ratio | 0.47 | 0.47 |
| Dehydrogenation results, percent: | | |
| Conversion | 15.7 | 21.4 |
| Mono-olefins | 12.1 | 18.4 |
| Di-olefins | 1.7 | 1.3 |
| Aromatic hydrocarbons | 2.2 | 2.0 |
| Selectivity | 77.1 | 84.1 |

Upon comparing these results, it is readily ascertained that the addition of lithium increases the degree of selectivity of conversion to the desired mono-olefin, primarily through a decrease in the cracking and isomerization reactions, and there has been a decrease in the quantity of aromatic hydrocarbons produced.

A third catalyst was prepared in which no arsenic was present; the composite did, however, contain 0.75% platinum and 0.50% lithium. The dehydrogenation of n-dodecane was effected at the foregoing conditions for a two-hour period, and the results are presented in the following Table II (for convenience, the results obtained from catalyst B are repeated):

TABLE II.—EFFECT OF ARSENIC

| Catalyst designation | B | C |
| --- | --- | --- |
| Catalyst composition, wt. percent: | | |
| Platinum | 0.75 | 0.75 |
| Lithium | 0.50 | 0.50 |
| Arsenic/platinum ratio | 0.47 | 0 |
| Dehydrogenation results, percent: | | |
| Conversion | 21.4 | 16.7 |
| Mono-olefins | 18.4 | 14.2 |
| Di-olefins | 1.3 | 2.1 |
| Aromatic hydrocarbons | 2.0 | 1.1 |
| Selectivity | 84.1 | 85.0 |

The results obtained through the use of catalyst C, compared to catalyst B, clearly indicate the necessity for the inclusion of arsenic in the catalyst preferred for use in the present process. Furthermore, when the results of using all three catalysts, A, B and C, are compared, it becomes evident that both lithium and arsenic are required for acceptable conversion and selectivity.

With respect to the utilization of various additives to the long-chain paraffin charge stock, it has been found that the use of water as high as 2,500 p.p.m., based upon the charge stock, has no deleterious effect on the percent conversion or selectivity. However, I have also noted that the quantity of aromatic hydrocarbons produced is lessened while the quantity of di-olefinic hydrocarbons is slightly increased. By itself, the addition of sulfur, or the inclusion of sulfur as a component of the catalytic composite, appears to have little effect upon conversion and/or selectivity of long chain paraffins. However, when coupled with the use of water as an additive, minor quantities of sulfur, about 100–1000 p.p.m. thereof, has indicated increased stability although the overally activity appears to be slightly decreased.

Example III

This example is presented to illustrate the effect of water addition to the long-chain paraffin feed. All the indicated operations were conducted at conditions including 10.0 p.s.i.g., an 8:1 hydrogen/hydrocarbon mol ratio and a liquid hourly space velocity of 16.0. The catalytic composite was alumina containing 0.5% lithium, 0.75% platinum and arsenic in an atomic ratio to platinum of 0.47. Sulfur addition in all instances was 100 p.p.m. (based upon the paraffin charge), and water addition rate was varied as indicated; the charge stock was n-dodecane.

In order to determine the effect of water on catalyst stability, the overall operation was separated into three segments in which the temperature for the first eight hours was maintained at 454° C., increased to 477° C. for the next eight hours, and lowered to 454° C. for a last two-hour segment. Each segment was separated from the previous by a two-hour line-out period. The concentration of water was varied from 0 to 3,000 p.p.m. (based upon the paraffin feed).

The results are presented in the following Table III:

TABLE III.—EFFECT OF WATER ADDITION

| Period number | A | | B | | C | |
|---|---|---|---|---|---|---|
| Time in hours | 2–8 | | 10–16 | | 18–20 | |
| Temperature, °C | 414 | | 477 | | 454 | |
| P.p.m. | | | Percent | | | |
| Water | Sulfur | Conversion | Selectivity | Conversion | Selectivity | Conversion | Selectivity |
| 0 | 0 | 17.6 | 86.5 | 21.1 | 82.2 | 13.3 | 91.7 |
| 400 | 100 | 12.7 | 92.9 | 22.2 | 91.3 | 13.3 | 96.2 |
| 1,500 | 100 | 14.2 | 93.0 | 20.4 | 88.4 | 13.7 | 94.9 |
| 3,000 | 100 | 14.7 | 93.1 | 20.0 | 87.0 | 12.6 | 94.5 |

Upon referring to the data presented in Table III, it will be noted that, although the addition of water (400–3000 p.p.m.) and sulfur (100 p.p.m.) decreases the initial activity, there is an accompanying consistent increase in selectivity of conversion to the mono-olefin. Of greater significance is the result obtained during period C, after the operation had been conducted at the higher temperature of 477° C., for eight hours (discounting the two-hour line-out period following the initial operation at 454° C.) in which the temperature had been lowered to 454° C. The activity remains about the same with and without the water addition, but the selectivity has been improved. Furthermore, it is evident that catalyst stability has been significantly improved, as shown by a comparison of the conversions in columns A and C. With respect to results which have been obtained to the dehydrogenation of n-undecane, n-dodecane indicates more activity and somewhat less selectivity, but the differences are smaller in the presence of the additives than in their absence.

Example IV

A comparison between the homologs, n-undecane, n-dodecane and n-tridecane, with the same catalyst, and under identical operating conditions is summarized in Table IV hereinafter set forth. It appears that as the molecular weight of the long-chain paraffin increases, the reactivity (percent conversion) increases, but the selectivity of conversion to the mono-olefin is somewhat decreased. Furthermore, the catalyst appears to be more stable when processing the lower molecular weight homologs.

ponent—in this case, arsenic. The catalyst was identical to that employed in the previous examples, with the exception that the arsenic to platinum atomic ratio was 0.3. Operations were effected at a hydrogen/hydrocarbon mol ratio of 8:1, a liquid hourly space velocity of 32.0 and a pressure of 13.0 p.s.i.g. at the inlet to the reaction zone; water was added to the n-dodecane feed in an amount of 2,000 p.p.m.

In the run effected without arsenic in the catalyst, at a temperature of 427° C., the conversion, at the end of 15 hours, was 8.2%, the olefins produced were 6.6% and 1.6% represented aromatic hydrocarbons. The temperature was increased to 454° C., and a composite sample taken during the 60–65 hour period showed 9.6% conversion, with 8.3% olefins and 1.3% aromatics. A composite sample taken during the 105–110 hour period, with the temperature at a level of 477° C., showed a conversion of 5.8%, 4.6% olefins and 1.3% aromatic hydrocarbons. These results are indicative of the degree of instability, notwithstanding the presence of 2000 p.p.m. of water.

At the identical conditions, but with an arsenic-attenuated catalyst, the conversion, at 427° C. during the 10–15 hour period was 7.8%, the olefins were 7.0% and 0.8% aromatics were produced. At a temperature of 454° C. (55–60 hour composite sample), the conversion was 14.2%, of which 12.3% represents olefins and 1.9% aromatics. During 100–115 hours, at a temperature of 477° C., the conversion was 12.5, representing 10.9% olefins and 1.6% aromatics. The degree of activity decline, compared to that observed with the non-attenuated catalyst has significantly improved.

TABLE IV.—HOMOLOG COMPARISON

| | Paraffin | | | | | | | | |
|---|---|---|---|---|---|---|---|---|---|
| | $C_{13}H_{28}$ | | | $C_{12}H_{26}$ | | | $C_{11}H_{24}$ | | |
| Period No | A | B | C | D | E | F | G | H | I |
| Hours on stream | 2–8 | 10–12 | 26–32 | 2–8 | 10–16 | 18–20 | 2–8 | 10–16 | 18–30 |
| Temperature | 454 | 477 | 454 | 454 | 477 | 454 | 454 | 477 | 454 |
| Percent conversion | 16.9 | 22.7 | 13.2 | 12.7 | 22.2 | 13.3 | 12.6 | 18.6 | 12.2 |
| Percent selectivity | 89 | 85 | 93 | 93 | 91 | 96 | 95 | 87 | 96 |

With the exception of the indicated temperature change, all periods were effected at conditions including 10.0 p.s.i.g., 16.0 liquid hourly space velocity, 8:1 hydrogen/hydrocarbon mol ratio, 400 p.p.m. of water and 100 p.p.m. of sulfur.

I have further found that the effect of water on conversion activity is also pronounced at higher space velocities. In an operation at 32.0 liquid hourly space velocity, 8.0 hydrogen/hydrocarbon mol ratio, 10.0 p.s.i.g. and 466° C., utilizing n-dodecane as the paraffin charge, the conversion activity decreased from 18.0 to 12.0 during the first fifty hours of operation. Under the same operating conditions, with, however, the addition of 2000 p.p.m. of water, the percent conversion remained relatively constant in the range of 14.5 to 16.0 for more than 100 hours.

Example V

This example is given for the purpose of illustrating the stabilizing effect exhibited by the attenuating com- Example VI In order to illustrate the preferred operating pressure above 10.0 p.s.i.g., an operation was effected at 8:1 hydrogen/hydrocarbon mol ratio, 32.0 liquid hourly space velocity, 10.0 p.s.i.g. and 454° C. After 300 hours at these conditions, the rate of decline in conversion of n-dodecane was determined to be 1.0% per 80 hours. The pressure was increased to 15.0 p.s.i.g., and rate of conversion decline was reduced to 1.0% per 400 hours.

The effect of increasing the pressure to 15.0 p.s.i.g. was so unique that a specific catalyst stability test was performed. The operating conditions included a liquid hourly space velocity of 32.0, a catalyst bed inlet pressure of 16.5 p.s.i.g. and an outlet pressure of 15.0 p.s.i.g., a hydrogen/hydrocarbon mol ratio of 8:1 and a temperature of 441° C. for the first 40 hours. The temperature was increased, after 40 hours, to 454° C., and the operation continued for a total of 246 hours. The following Table V summarizes the data at the higher temperature level:

TABLE V.—STABILITY TEST

| Period hrs. | Conv., percent | Olefins | Selectivity, percent |
|---|---|---|---|
| 40–45 | 11.9 | 11.1 | 93.2 |
| 75–80 | 11.8 | 10.4 | 88.2 |
| 110–115 | 11.6 | 10.7 | 92.2 |
| 155–160 | 11.2 | 10.7 | 95.5 |
| 204–210 | 12.0 | 11.4 | 95.0 |
| 240–246 | 11.4 | 10.6 | 93.0 |

Example VII

Dehydrogenation of n-paraffins was effected separately utilizing n-pentadecane, n-heptadecane and n-octadecane as the charge stocks. An alumina composite with 0.75% platinum, 0.50% lithium and an arsenic/platinum atomic ratio of 0.30 was employed at a pressure of 20.0 p.s.i.g. an LHSV of 32.0, a hydrogen/hydrocarbon mol ratio of 8.0 and in the presence of 2000 p.p.m. of water. Under these conditions, and at a temperature of 440° C., n-pentadecane was converted to an extent of 9.5% with a selectivity to the mono-olefin of 95.0%; at 454° C., the conversion was 13.0%, and the selectivity was 90.0%.

Using n-heptadecane, at a temperature of 440° C., the conversion was 11.0% with a selectivity to the mono-olefin of 94.0%. At this temperature, the conversion of octadecane was 13.0%, and the selectivity, based upon trace quantities of diolefins and aromatic hydrocarbons, was virtually 100.0%.

The foregoing examples and specification clearly illustrate the method by which the present dehydrogenation process is effected, and indicate the benefits to be afforded through the utilization thereof. Long-chain n-paraffin dehydrogenation has been carefully controlled to produce acceptable yields of n-mono-olefins at exceptionally high selectivity of conversion.

I claim as my invention:

1. A process for dehydrogenating a normal paraffinic hydrocarbon having from about 10 to about 18 carbon atoms in straight chain arrangement, which comprises contacting said paraffinic hydrocarbon with a catalytic composite of alumina, from about 0.01% to about 1.5% by weight of lithium, from about 0.05% to about 5.0% by weight of a Group VIII noble metal component and a metallic component selected from the group consisting of arsenic, antimony, bismuth and compounds thereof in an atomic ratio to said Group VIII component of from about 0.20 to about 0.50, at dehydrogenating conditions including a temperature of from about 400° C. to about 600° C. and a liquid hourly space velocity of at least 12.0.

2. The process of claim 1 further characterized in that said Group VIII component is platinum and said metallic component is arsenic.

3. The process of claim 1 further characterized in that said paraffin is n-undecane.

4. The process of claim 1 further characterized in that said paraffin is n-dodecane.

5. The process of claim 1 further characterized in that said paraffin is n-pentadecane.

References Cited

UNITED STATES PATENTS

| 3,126,426 | 3/1964 | Turnquest et al. | 260—683.3 |
| 3,168,587 | 2/1965 | Michaels et al. | 260—683.3 |
| 3,293,319 | 12/1966 | Haensel et al. | 260—683.3 |
| 3,360,586 | 12/1967 | Bloch et al. | 260—683.3 |

DELBERT E. GANTZ, *Primary Examiner.*

G. E. SCHMITKONS, *Assistant Examiner.*

U.S. Cl. X.R.

252—464